T. FREW.
EMERGENCY CLOSING MECHANISM FOR GAS MAINS.
APPLICATION FILED SEPT. 30, 1916.
1,233,214.
Patented July 10, 1917.
4 SHEETS—SHEET 1.
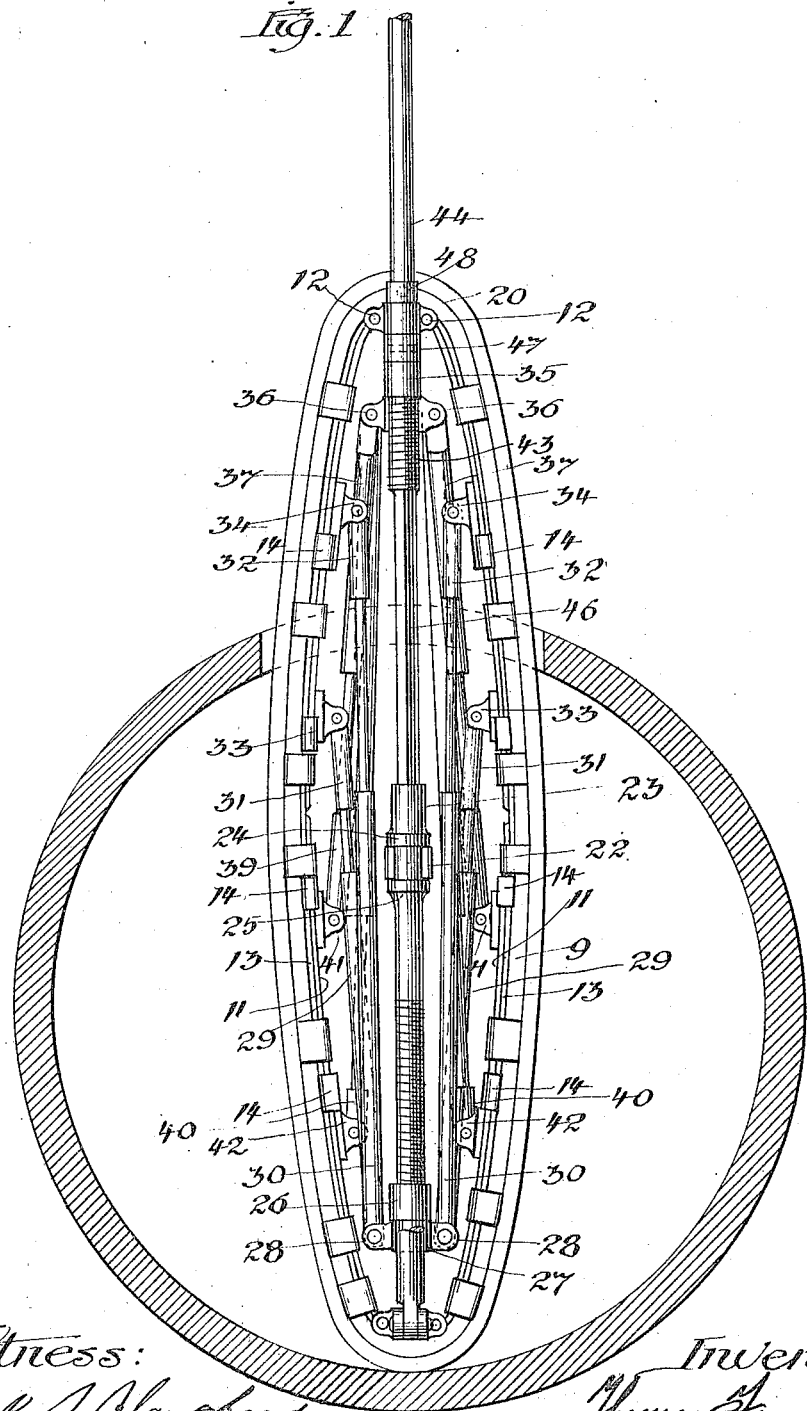

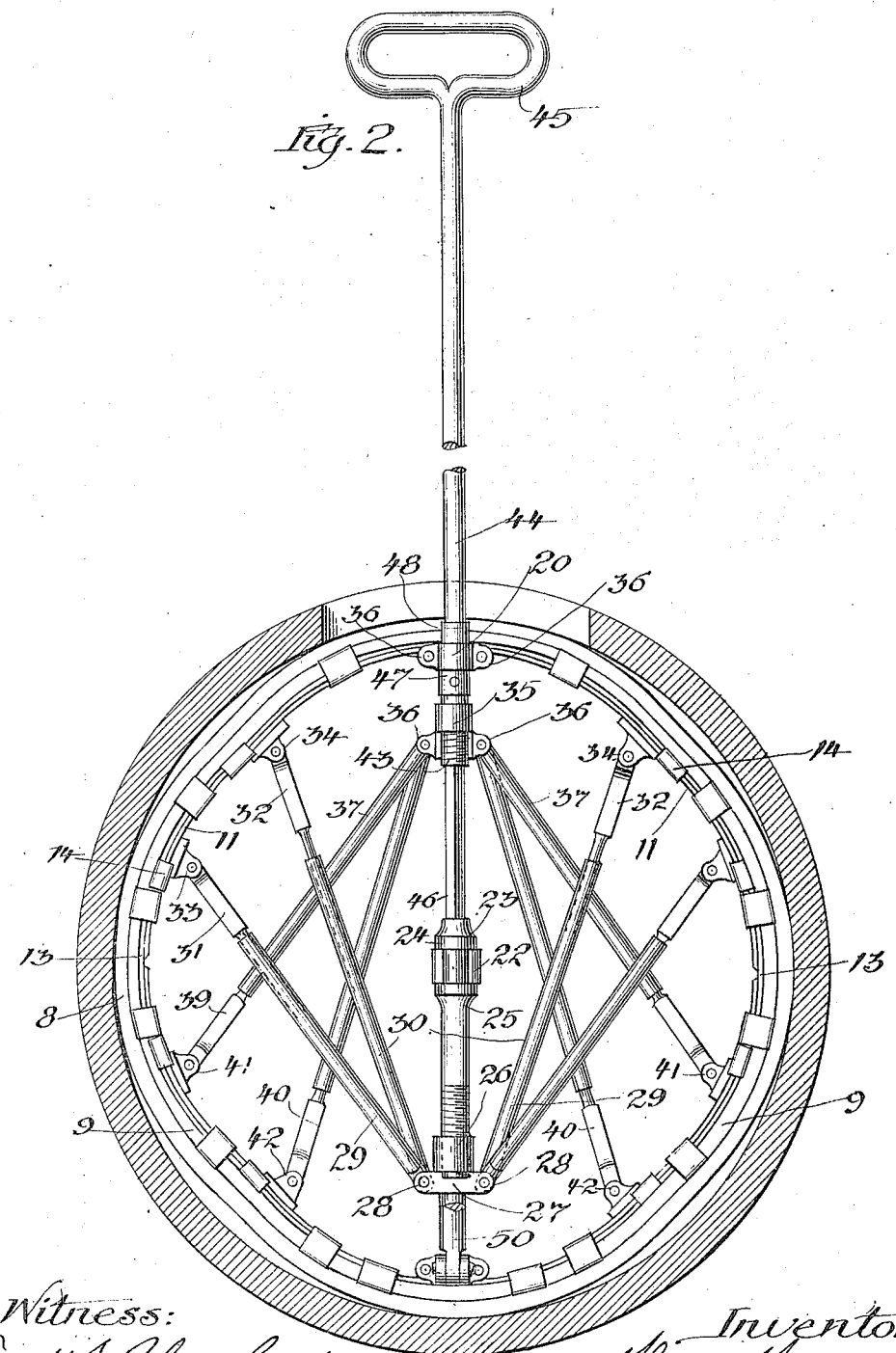

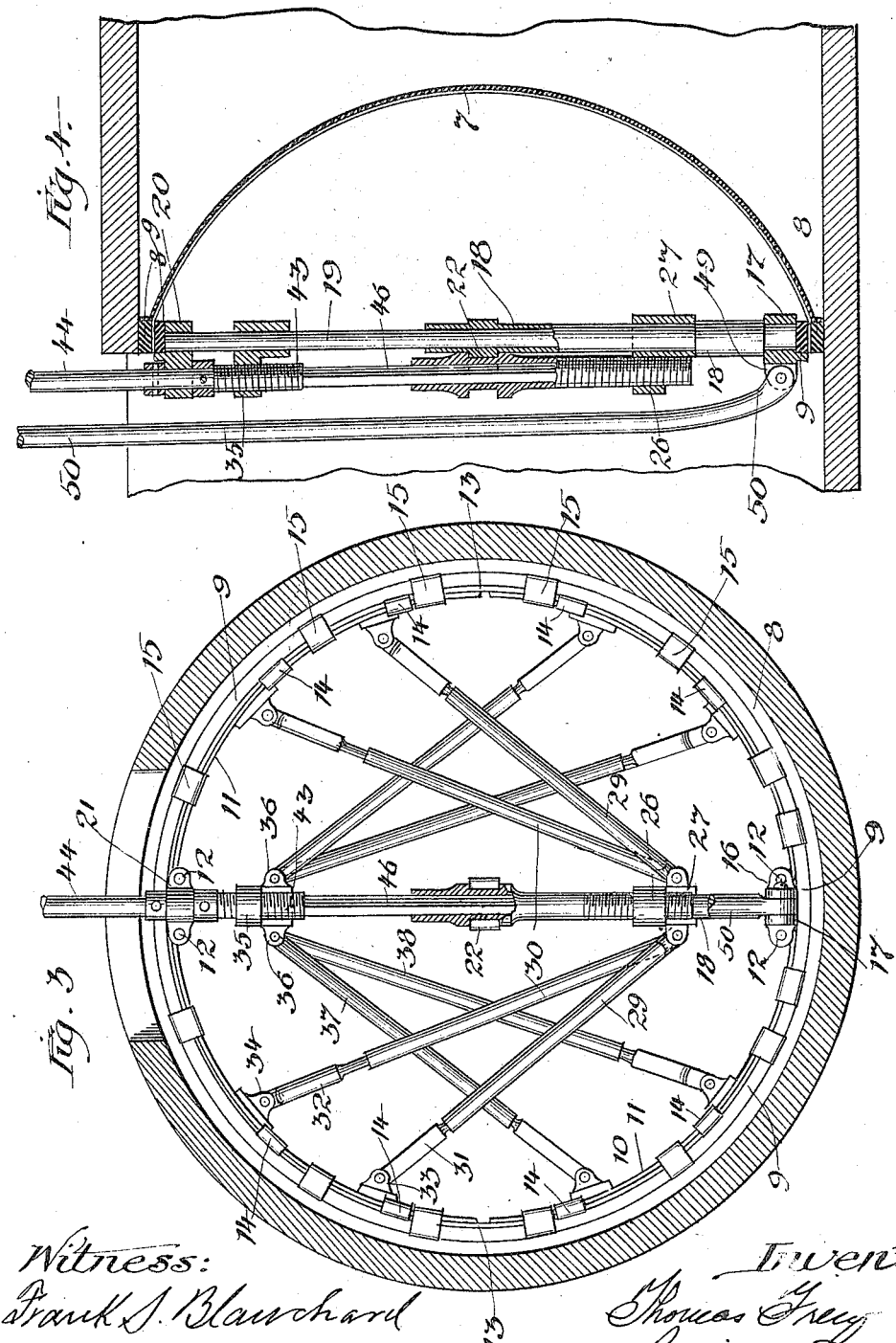

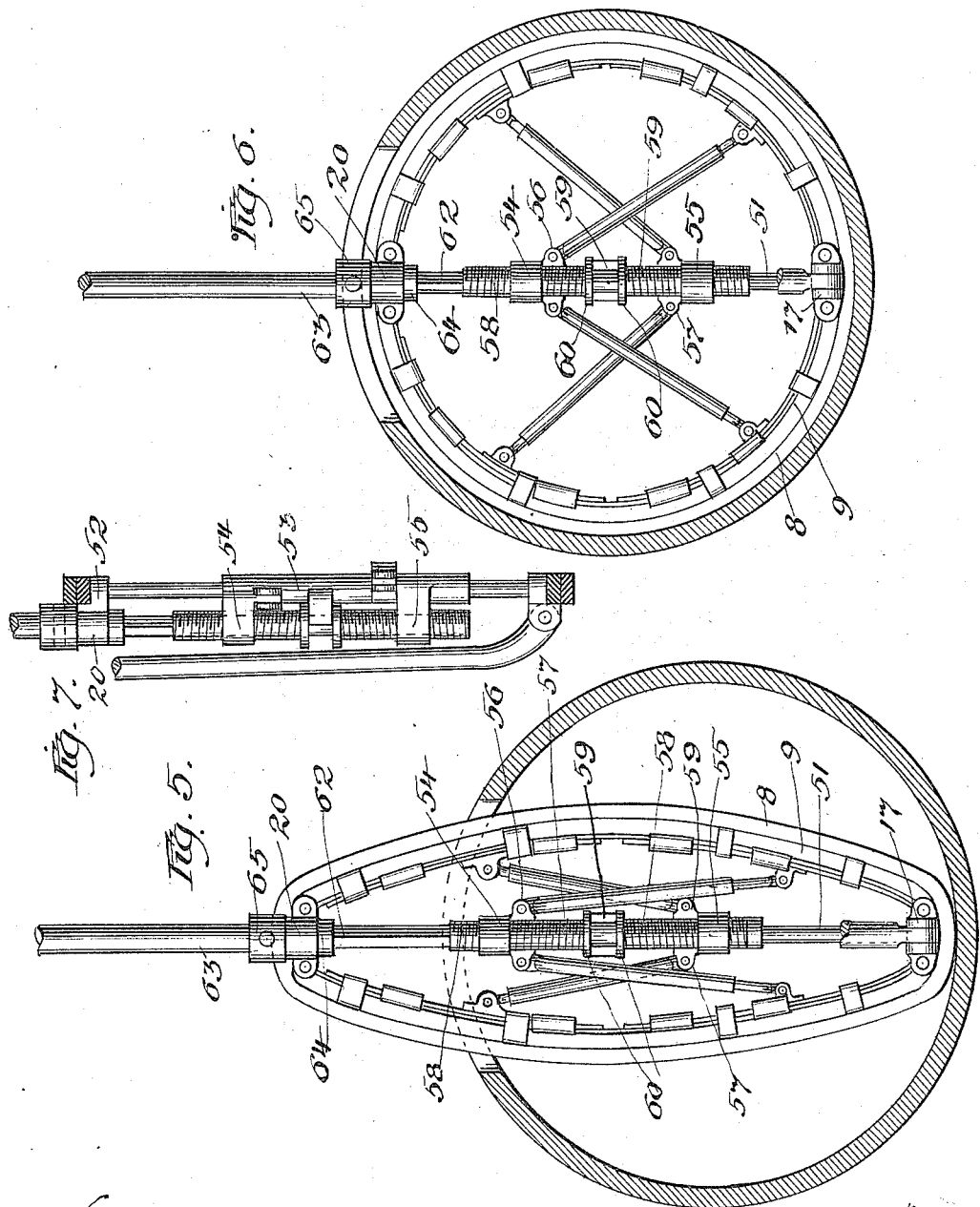

UNITED STATES PATENT OFFICE.

THOMAS FREW, OF CHICAGO, ILLINOIS.

EMERGENCY CLOSING MECHANISM FOR GAS-MAINS.

1,233,214.  Specification of Letters Patent.  Patented July 10, 1917.

Application filed September 30, 1916. Serial No. 123,004.

*To all whom it may concern:*

Be it known that I, THOMAS FREW, a citizen of the United States, residing at Chicago, county of Cook, and State of Illinois, have invented certain new and useful Improvements in Emergency Closing Mechanism for Gas-Mains, of which the following is a specification.

This invention is designed for use in effecting a quick closure of a gas main which has sprung a leak and the invention has for its object to so construct and regulate the frame-work of the device that it may be collapsed into a very narrow compass, thereby permitting it to be inserted through a small aperture cut in the pipe within the main and afterward expanded within the main to prevent further escape of the gas.

The invention is particularly designed to so effect the expansion of the parts as to insure a tight and firm closure at all points against the surrounding walls of the main by the adjustment of means which are within easy control of the user.

Further objects will appear from a detailed description of the invention which consists of the features of construction and combination of parts hereinafter described and claimed.

In the drawings:

Figure 1 is a front elevation of the closing device of the present invention in the collapsed condition in which it is entered through a slot or opening in the main;

Fig. 2 is a similar view showing the closing diaphragm partially expanded;

Fig. 3 is a similar view showing the closing diaphragm fully expanded;

Fig. 4 is a sectional elevation of the device adjusted as in Fig. 3;

Fig. 5 is a front elevation of a modified form of the device as used for the closing of smaller sized mains;

Fig. 6 is a view of the same in completely expanded condition; and

Fig. 7 is a side elevation of the adjusting screw and associated parts of the device shown in Figs. 5 and 6.

Referring particularly to the device of Figs. 1 to 4, the closing of the main is effected by means of a diaphragm 7 of rubber or the like which is preferably of bag-shaped formation and is inserted into the main to present its convex face toward the flow of the escaping gas.

The diaphragm 7 is reinforced around its outer edge by the use of a rubber packing band 8, which when the device is expanded, is designed to bear firmly against the inner walls of the main in order to afford a gas-tight closure. The packing band 8 fits over and closely surrounds an inner rubber band 9 which is adapted to be expanded by pressure exerted upon a divided expansion ring 10 consisting of two halves. Each of the halves comprises a plurality of flat leaves of spring steel.

The innermost leaves 11 of each half of the expansion ring are hinged to the pivots 12 at their outer ends and are of a length equal to slightly less than one-fourth of a complete circle, so that when the parts are expanded as in Fig. 3 the adjacent inner ends of the inner leaves will be spaced apart slightly in order to accommodate the expanding of the device. When the device is collapsed as in Fig. 1, however, the inner ends of the inner leaves will lie closely adjacent to one another.

In order to accommodate this expansive movement and at the same time bridge the joint between the inner ends of the inner leaves, an outer leaf 13 is provided which bridges and overlaps the adjoining ends of the inner leaves and is held in firm flatwise contact therewith by means of metal guide straps 14 which are secured to the ends of the outer leaf and slidingly embrace the adjacent inner leaves, so that the latter may have sliding endwise movement as the adjustment is effected.

The inner and outer leaves are united to the surrounding inner rubber ring 9 by means of a plurality of clamps 15 which embrace the leaves, but without interfering with the sliding action above referred to. The normal position of the spring leaves is that shown in Fig. 1 in which the leaf sections are but slightly bowed, and in order to permit the insertion of the device within a relatively small aperture in the gas main, the width of the device is reduced to a minimum. In order to expand the device to circular form, it is necessary to apply pressure from within, which shall be sufficiently distributed to spread the expansion ring to circular form in order to press the rubber packing tightly against the circular wall of the surrounding gas main. The expanding mechanism designed for this purpose will now be described.

The lowermost pivots 12 which carry the lower outer ends of the inner spring leaves are entered through ears 16 on opposite sides of the lower fitting 17 which is mounted upon the lower end of a tubular standard 18, best shown in Fig. 4. This standard receives the lower end of a sliding rod 19 which, at its upper end, carries an upper fitting 20 which is the companion of the lower fitting 17 and is likewise provided with ears 21 which receive the upper pivots 12 to which the outer ends of the inner spring leaves are hinged. The rod 19 telescopes within the standard 18, so that when the device is collapsed as in Fig. 1, the total length of the mounting afforded by these parts will be much greater than the internal diameter of the intended gas main, but when the parts are telescoped together to the desired degree, the external vertical dimensions of the device will be equal to the internal diameter of the gas main, so that the device may be inserted in place within the main, as shown in Fig. 2.

With the parts thus positioned, the device will approximate circular form, bearing heavily against the walls of the main at the top and bottom and two sides where the pressures are centered, but in order to additionally expand the intermediate portions of the device to afford a complete closure, it is necessary to provide screw expansion means of the character now to be described.

The standard 18, at its upper end, is provided with a fitting 22 which outwardly projects from the standard and affords an open journal mounting for the upper end of an adjustable screw shank 23 which is provided with collars 24 and 25 which embrace the upper and lower sides of the fitting 22 and permit the screw shank to rotate upon the standard 18 as a bearing without permitting longitudinal movement of the parts with respect to one another.

The screw shank at its lower end is provided with a threaded portion 25 which is threaded into a collar 26 outwardly projecting from a rider 27 having laterally extending ears 28 on each side, each of which serves as a pivotal mounting for a short expansion arm 29 and a long expansion arm 30, which are adapted to swing about their pivotal points in a plane co-incident with the plane of expansion of the device.

The expansion arms 29 and 30 are of tubular formation and respectively receive the telescoping arm sections 31 and 32 which are pivoted to ears 33 and 34 on the adjacent inner spring leaf, so that the expansive force exerted by the inward movement of the rider will be distributed to suitable points on the expansion ring.

The lower rider 27 coöperates with the upper rider 35 provided with ears 36, to each of which are pivoted short and long arms 37 and 38, provided with telescoping outer sections 39 and 40 pivoted to ears 41 and 42 identically with the arms and associated features previously described.

The rider 35 is mounted upon an upper screw 43 which is formed near the inner end of the stem 44, which terminates in a handle 45, the threads of the screw 43 being in reverse relation to the threads on the adjustable screw shank 23. Below the screw 43 the stem is provided with a squared extension 46 which is telescoped into the end of the adjustable screw shank 23, the arrangement being one which compels the screw shank to rotate in unison with the handle stem as the latter is turned, but permits independent longitudinal movement of the parts to effectuate the outward thrust of the expansion arms. The handle stem 44 is journaled through the upper fitting 20 to the ears of which the spring sections are hinged and the stem is provided with inner and outer collars 47 and 48 to prevent longitudinal movement of the shank within the journal bearing thus afforded.

The lower fitting 17 is provided with a pair of forwardly extending ears 49 which serve to pivot the lower end of a secondary handle 50 which extends upwardly in parallelism with the handle stem 44 and serves to assist in the manipulation of the device.

The modified construction shown in Figs. 5 and 6 is similar in all essential respects to that previously described, but being smaller in size, the number of expansion arms is reduced, only four being employed instead of 8.

The construction is identical to the expansion ring, diaphragm, packing ring and expansion arms heretofore described, so that further description of these parts is unnecessary. The arrangement of the screw members, however, is slightly modified, and reference will now be made more particularly to these features.

The lower fitting 17 serves to support a lower standard 51 which coöperates with an upper standard 52 which depends from the upper fitting 20. These standards are of a combined length equal to the inner diameter of the device when expanded to circular form. The ends of the two standards are telescoped into a center sleeve 53 which serves as a mounting for an upper rider 54 and a lower rider 55, the former being provided with ears 56 and the latter with ears 57 which serve to pivot the inner ends of the expansion arms in a manner identical with that heretofore described.

The riders are mounted upon right and left screw threads 58 and 59 formed on a screw shank which is journaled at the center between a pair of ears 60 outwardly extending from the center of the sleeve 53, flanges 61 being provided to maintain the screw shank against longitudinal movement while permitting its rotation. The upper end of the screw shank terminates in a squared extension 62 which is telescoped into the end of an operating handle 63 provided with collars 64 and 65 on opposite sides of the upper fitting 20, within which the handle is journaled.

In operation, when it is necessary to use the device of the present invention, the leaky main will be drilled or cut and an aperture formed of dimensions sufficient to permit of the insertion of the device in collapsed condition. After the device has been thrust into the aperture until it contacts with the floor at the bottom of the main, a downward pressure will be exerted on the operating handle and the telescoping parts of the mounting will slip into one another, so that the riders to which the expansion arms are pivoted will move in toward one another, thereby causing the arms to spread outwardly and exert an expansive force against the expansion ring.

This action bows the sections of the ring into approximately circular form and reduces the vertical dimensions of the device with a corresponding expansion thereof in a horizontal direction. After the parts have been brought to this position, which is indicated in Fig. 2, it will be possible to slip back the upper edge of the device sufficiently to bring it under the uncut wall of the main, immediately behind the aperture, so that it will thus be held against collapsing during the subsequent manipulation of the screw members.

After the parts are thus held in position, the operating handle will be turned, which will cause the riders to travel an additional distance inward along the right and left screws upon which they are mounted, so that an additional expansive force will be developed sufficient to completely expand the ring and effect a complete closure of the main. Provision of these screw elements is very essential to a complete expansion of the device for the reason that it will be found practically impossible to secure a complete expansion by a direct downward thrust of the operating handle, and for the further reason that it would be impossible to force back the sealing ring completely into the main behind the aperture therein after the parts have been completely expanded.

By arranging the screw elements in the manner specified, a complete insertion of the device can be readily effected, after which the parts will be screwed up and a heavy expansive force developed which will result in a complete sealing of the main at all points.

In the device in Figs. 1 to 4, the screw sections are formed on separate portions of the structure which telescope into one another, whereas in the smaller device in Figs. 5 to 7, the screw elements are formed on the same section, which in turn telescope into the handle stem, but the action in the two cases, when the screw features come into play, is practically identical. The differences in the two cases pertain mainly to the method of mounting the active elements, but the operation of the latter is not essentially different.

It will be seen from the foregoing description that the device of the present invention is one which is adapted to be easily and quickly inserted into an aperture in the main by a quick inward thrust of the handles, so that the major portion of the leak will be quickly blocked off, and thereafter the parts can be powerfully expanded by the action of the low-pitched screw to firmly seal the main at all points.

I claim:

1. In a device of the class described, the combination with a diaphragm, an expansion ring upon which the diaphragm is mounted, means for imparting an inward thrust for partially expanding the ring, and means operable by rotation of the first mentioned means for additionally expanding the ring after the complete insertion within the main, substantially as described.

2. In a device of the class described, the combination with a diaphragm, an expansion ring upon which the diaphragm is mounted, means for imparting an inward thrust for partially expanding the ring, and screw means operable by rotating the first mentioned means for additionally expanding the ring after the complete insertion within the main, substantially as described.

3. In a device of the class described, the combination with a diaphragm, an expansion ring upon which the diaphragm is mounted, a rotatable telescoping element for partially expanding the ring, and screw elements operable by the rotation of the telescoping element for further expanding the ring, substantially as described.

4. In a device of the class described, the combination with a diaphragm, an expansion ring upon which the diaphragm is mounted, a telescoping element for partially expanding the ring, screw elements for additionally expanding the ring, riders mounted to travel toward and from one another on the screw elements, and expansion arms carried by the riders and bearing against the expansion ring, substantially as described.

5. In a device of the class described, the combination with a diaphragm, an expansion ring upon which the diaphragm is mounted, a telescoping element for partially expanding the ring, screw elements for additionally expanding the ring, riders mounted to travel toward and from one another on the screw elements, and expansion arms pivoted to the riders and bearing against the expansion ring, substantially as described.

6. In a device of the class described, the combination with a diaphragm, an expansion ring upon which the diaphragm is mounted and consisting of leaves mounted to move lengthwise upon one another, a telescoping element for partially expanding the ring, screw elements for additionally expanding the ring, riders mounted to travel toward and from one another on the screw elements, and expansion arms carried by the riders and bearing against the expansion ring, substantially as described.

7. In a device of the class described, the combination with a diaphragm, an expansion ring upon which the diaphragm is mounted and consisting of leaves mounted to move lengthwise upon one another, a telescoping element for partially expanding the ring, screw elements for additionally expanding the ring, riders mounted to travel toward and from one another on the screw elements, and expansion arms pivoted to the riders and bearing against the expansion ring, substantially as described.

8. In a device of the class described, the combination with a diaphragm, a packing ring mounted upon the rim of the diaphragm, an expansion ring bearing against the packing ring, rotatably mounted screw elements having right and left threads, riders mounted upon the screw elements, and arms connecting the riders and expansion ring for expanding the latter by inward movements of the former, substantially as described.

9. In a device of the class described, the combination with a diaphragm, an expansion ring adapted to expand the diaphragm, companion telescoping members secured to opposite sides of the expansion ring and adapted to telescope under pressure to spread the ring, and telescoping expansion arms pivoted at their outer ends to the expansion ring and adapted to be spread by the inward telescoping action to the telescoping members, substantially as described.

10. In a device of the class described, the combination with a diaphragm, an expansion ring adapted to expand the diaphragm, companion telescoping members secured to opposite sides of the expansion ring and adapted to telescope under pressure to spread the ring, expansion arms pivoted at their outer ends to the expansion ring and adapted to be spread by the telescoping action of the parts, rotatable right and left screw elements carried by the telescoping members, and riders mounted upon said screw elements and having the inner ends of the expansion arms pivoted thereto for imparting an additional outward thrust to the expansion arms, substantially as described.

11. In a device of the class described, the combination with a diaphragm, an expansion ring adapted to expand the diaphragm formed of sections slidably mounted upon one another, companion telescoping members secured to opposite sides of the expansion ring and adapted to telescope under pressure to spread the ring, and telescoping expansion arms pivoted at their outer ends to the expansion ring and adapted to be spread by the inward telescoping action to the telescoping members, substantially as described.

12. In a device of the class described, the combination with a diaphragm, an expansion ring adapted to expand the diaphragm formed of sections slidably mounted upon one another, companion telescoping members secured to opposite sides of the expansion ring and adapted to telescope under pressure to spread the ring, expansion arms pivoted at their outer ends to the expansion ring and adapted to be spread by the telescoping action to the parts, rotatable right and left screw elements carried by the telescoping members, and riders mounted upon said screw elements and having the inner ends of the expansion arms pivoted thereto for imparting an additional outward thrust to the expansion arms, substantially as described.

13. In a device of the class described, the combination with a diaphragm, an expansion ring adapted to expand the diaphragm and consisting of companion sections, fittings to which the ends of the sections are secured, telescoping members carried by the fittings, rotatable right and left screw elements carried by the telescoping elements, riders mounted upon the screw elements, and arms pivoted at their inner ends to the riders, and secured at their outer ends to the sections of the expansion ring, substantially as described.

14. In a device of the class described, the combination with a diaphragm, an expansion ring adapted to expand the diaphragm and consisting of companion sections, fittings to which the ends of the sections are secured, telescoping members carried by the fittings, rotatable right and left screw elements carried by the telescoping elements, riders mounted upon the screw elements, and telescoping arms pivoted at their inner ends to the riders, and secured at their outer ends to the sections of the expansion ring, substantially as described.

15. In a device of the class described, the combination with a diaphragm, a packing ring surrounding the rim of the diaphragm, an expansion ring consisting of two sections, each section consisting of spring leaves mounted slidably upon one another, upper and lower fittings to which the ends of the ring sections are pivoted, a standard carried by the lower fitting, a screw element rotatably mounted on the standard, a rotatable operating handle provided with an extension at its inner end telescoping into the screw element for rotating the same and provided behind the extension with a screw element having threads reversely formed with respect to the threads of the first screw element, a rider on each of the screw elements, and arms pivoted at their inner ends to the riders and secured at their outer ends to the expansion ring for expanding the latter, substantially as described.

16. In a device of the class described, the combination with a diaphragm, a packing ring surrounding the rim of the diaphragm, an expansion ring consisting of two sections, each section consisting of spring leaves mounted slidably upon one another, upper and lower fittings to which the ends of the ring sections are pivoted, a standard carried by the lower fitting, a screw element rotatably mounted on the standard, a rotatable operating handle provided with an extension at its inner end telescoping into the screw element for rotating the same and provided behind the extension with a screw element having threads reversely formed with respect to the threads of the first screw element, a rider on each of the screw elements, and telescoping arms pivoted at their inner ends to the riders and secured at their outer ends to the expansion ring for expanding the latter, substantially as described.

17. In a device of the class described, the combination with a diaphragm, a packing ring surrounding the rim of the diaphragm, an expansion ring consisting of two sections, each section consisting of spring leaves mounted slidably upon one another, upper and lower fittings to which the ends of the ring sections are pivoted, a standard carried by the lower fitting, a screw element rotatably mounted on the standard, a rotatable operating handle provided with an extension at its inner end telescoping into the screw element for rotating the same and provided behind the extension with a screw element having threads reversely formed with respect to the threads of the first screw element, a rider on each of the screw elements, arms pivoted at their inner ends to the riders and secured at their outer ends to the expansion ring for expanding the latter, and a secondary handle pivoted to the lower fitting and adapted to normally lie in parallelism with the operating handle, substantially as described.

18. In a device of the class described, the combination with a diaphragm, a packing ring surrounding the rim of the diaphragm, an expansion ring consisting of two sections, each section consisting of spring leaves mounted slidably upon one another, upper and lower fittings to which the ends of the ring sections are pivoted, a standard carried by the lower fitting, a screw element rotatably mounted on the standard, a rotatable operating handle provided with an extension at its inner end telescoping into the screw element for rotating the same and provided behind the extension with a screw element having threads reversely formed with respect to the threads of the first screw element, a rider on each of the screw elements, telescoping arms pivoted at their inner ends to the riders and secured at their outer ends to the expansion ring for expanding the latter, and a secondary handle pivoted to the lower fitting and adapted to normally lie in parallelism with the operating handle, substantially as described.

THOMAS FREW.

Witness:
SAMUEL W. BANNING.

Copies of this patent may be obtained for five cents each, by addressing the "Commissioner of Patents, Washington, D. C."